United States Patent [19]

Hanni

[11] 4,121,158

[45] Oct. 17, 1978

[54] RADIO SYSTEM

[75] Inventor: Manfred Hanni, Munich, Germany

[73] Assignee: Siemens Aktiengesellschaft, Berlin & Munich

[21] Appl. No.: 736,164

[22] Filed: Oct. 22, 1976

Related U.S. Application Data

[63] Continuation of Ser. No. 552,163, Oct. 24, 1975, abandoned, which is a continuation-in-part of Ser. No. 324,067, Jan. 11, 1973, abandoned.

[51] Int. Cl.$^2$ .......................... H04B 1/38; H04B 7/04
[52] U.S. Cl. .................................... 325/55; 179/2 EB; 325/53
[58] Field of Search ....................... 325/14, 15, 53, 55; 179/41 A, 2 EB, 2 EA

[56] References Cited

U.S. PATENT DOCUMENTS

| | | | |
|---|---|---|---|
| 2,234,244 | 3/1941 | Gossel | 325/53 |
| 2,848,545 | 8/1958 | Mitchell | 325/55 |
| 3,104,392 | 9/1963 | Towler | 325/55 |
| 3,118,018 | 1/1964 | Cornell et al. | 179/41 A |
| 3,562,431 | 2/1971 | Inose et al. | 325/55 |
| 3,582,787 | 6/1971 | Muller | 325/55 |
| 3,626,112 | 12/1971 | Herquet | 179/41 A |
| 3,632,891 | 1/1972 | Basini et al. | 179/41 A |
| 3,692,952 | 9/1972 | Leonard | 179/41 A |
| 3,748,398 | 7/1973 | Schenkel et al. | 179/41 A |

*Primary Examiner*—Howard A. Birmiel

*Attorney, Agent, or Firm*—Hill, Gross, Simpson, Van Santen, Steadman, Chiara & Simpson

[57] ABSTRACT

A radio system includes a fairly large number of transmitting-receiving stations which are spatially distributed over an area to be covered. Each of the stations preferably serves a fairly large number of individual subscribers in such a way that the individual subscriber can reach a subscriber who may be connected to another transmitting-receiving station. Radio frequency channels with different frequencies are provided at least for the speech channels of adjacent exchanges and positioned in a frequency range which is fixed for the system. The transmission of the individual speech channel is provided in accordance with digital methods, preferably by means of converting the signals of the individual speech channel into a PCM or a pulse delta modulation signal. Preferably, the bandwidth for the individual signal is reduced through the use of a Vocoder. The transmitter of an exchange transmits its information toward the other exchanges, through which a connection is to be established to the called party, by way of an omnidirectional antenna which effects little grouping in the plane spatially determined by the exchange. Directional antennas are provided for receiving the radio frequency signals and preferably provide a relatively high degree of grouping in the horizontal plane and in the vertical plane. The transmitter therefore covers all exchanges which must be reached by way of one antenna while the receiver in each exchange will respectively receive the transmitters of the other exchanges by way of its associated directional antenna.

11 Claims, 5 Drawing Figures

RADIO SYSTEM

This is a continuation, of application Ser. No. 552,163, filed Feb. 24, 1975, which is a continuation of Ser. No. 324,067, filed Jan. 11, 1973, both now abandoned.

BACKGROUND OF THE INVENTION

1. Field of the Invention

This invention relates to a radio system having a fairly large number of transmitting and receiving stations (exchanges) spatially distributed over an area to be covered, and more particularly to such a system wherein each exchange preferably serves a fairly large number of individual subscribers in such a way that the individual subscriber can reach a subscriber who may be connected to another exchange, in particular by way of a connection which is established between the individual subscribers according to German Pat. No. 1,299,734.

2. Description of the Prior Art

It is essential for systems of the type described above to contain a fairly large number of exchanges with are provided in a network-like distribution over the area to be served. Each subscriber connected to any exchange of the network can therefore reach any other subscriber connected to an exchange of the network which is not yet interfered with a high safety factor, due to a particular connection construction, and possibly while utilizing the exchange purely as a transit or relay station. The individual exchanges of the system are thereby primarily interconnected by way of radio paths. The preparation of the individual speech channels is mostly provided in such a way that they are combined according to a time grouping method to become a modulation signal for the radio frequency carrier. The modulation signal then serves for the phase or frequency modulation of the radio frequency carrier. Often, the signals of the individual speech channels are previously converted into a pulse code modulation signal or into a pulse delta modulation signal for grouping of the speech channels. This entails the advantage that the essential noise voltage within the individual speech channels are merely the quantizing noises. Mainly when such an information transmission system operates with a large number of radio transmission paths, the construction expense of the apparatus within the individual exchange is relatively great. It should be pointed out that a complete directional radio device will be required for each connection to an adjacent exchange of the network. Therefore, it must be taken into account that the application of directional radio connections limits the guidance of traffic of the information between adjacent exchanges, since the conventional directional radio devices are designed for a certain number of speech channels. This is due to the fact that an essentially higher number of speech circuits must be provided for the individual directional radio connection in order to avoid overloading of the exchange during relay traffic than would ordinarily be found with respect to normal traffic.

The present invention is primarily concerned with providing not only a lower construction expense within the exchanges of a radio system of the type described above, including provision for the so called relay traffic, but also to provide an improvement in the flexibility of directing information within the radio system.

The foregoing object is achieved in a radio system of the type initially mentioned, according to the invention, in such a way that the radio frequency channels with different frequencies positioned in a frequency range determined for the system are provided in the radio system at least for the speech channels of adjacent exchanges. The transmission of the individual speech signal (speech channel) is provided according to a digital method, preferably by converting the signals of the individual speech channels into pulse code modulated (PCM) signals or into pulse delta modulation signals. Also the bandwidth is preferably reduced for the individual signals through the use of a vocoder device. Within an individual exchange the transmitter transmits its information toward the exchanges which are to be connected by way of an antenna which, at most, will group little in the plane spatially determined by the exchanges, and is preferably embodied as an omnidirectional antenna. Directional antennas, preferably having a relatively high grouping capability in the horizontal plane and in the vertical plane are provided for receiving the radio frequency signals. The directional antennas are directed toward the other exchanges so that all exchanges which can be reached by the transmitter of an individual exchange are reached by way of the omnidirectional antennas, while the individual receivers in each exchange respectively receive from the transmitter of another exchange by way of an associated directional antenna.

It is advantageous when several respectively adjacent frequency radio frequency speech channels form a speech channel group which is treated as a unit in the radio frequency range and from which the speech channels must respectively be selected for connection are obtained and exchanged in the intermediate frequency range of the individual receiver.

It is furthermore advantageous when the associated receiver for each direction of reception only includes the radio frequency part of a superheterodyne receiver and has an intermediate frequency output, and that the speech channels which must respectively be exchanged are selected on the basis of frequency from the intermediate frequency signals of the individual receivers in the same frequency position and are placed into the form of the original digital signal or even the original analog signal by means of demodulation. The signals of the channels are processed in this form either to the subscribers connected to this particular exchange or, in the case of relay traffic, are extended toward the transmitter of the exchange after a corresponding preparation, preferably while analogously reconverting the signals at an intermediate frequency.

It is furthermore advantageous to provide a regenerating circuit for the signals provided in the digital form in the demodulation path and/or in the case of relay traffic, in the preparation path for the intermediate frequency signal which must be further processed.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, on which.

DESCRIPTION OF THE PREFERRED EMBODIMENTS

Figure 1:
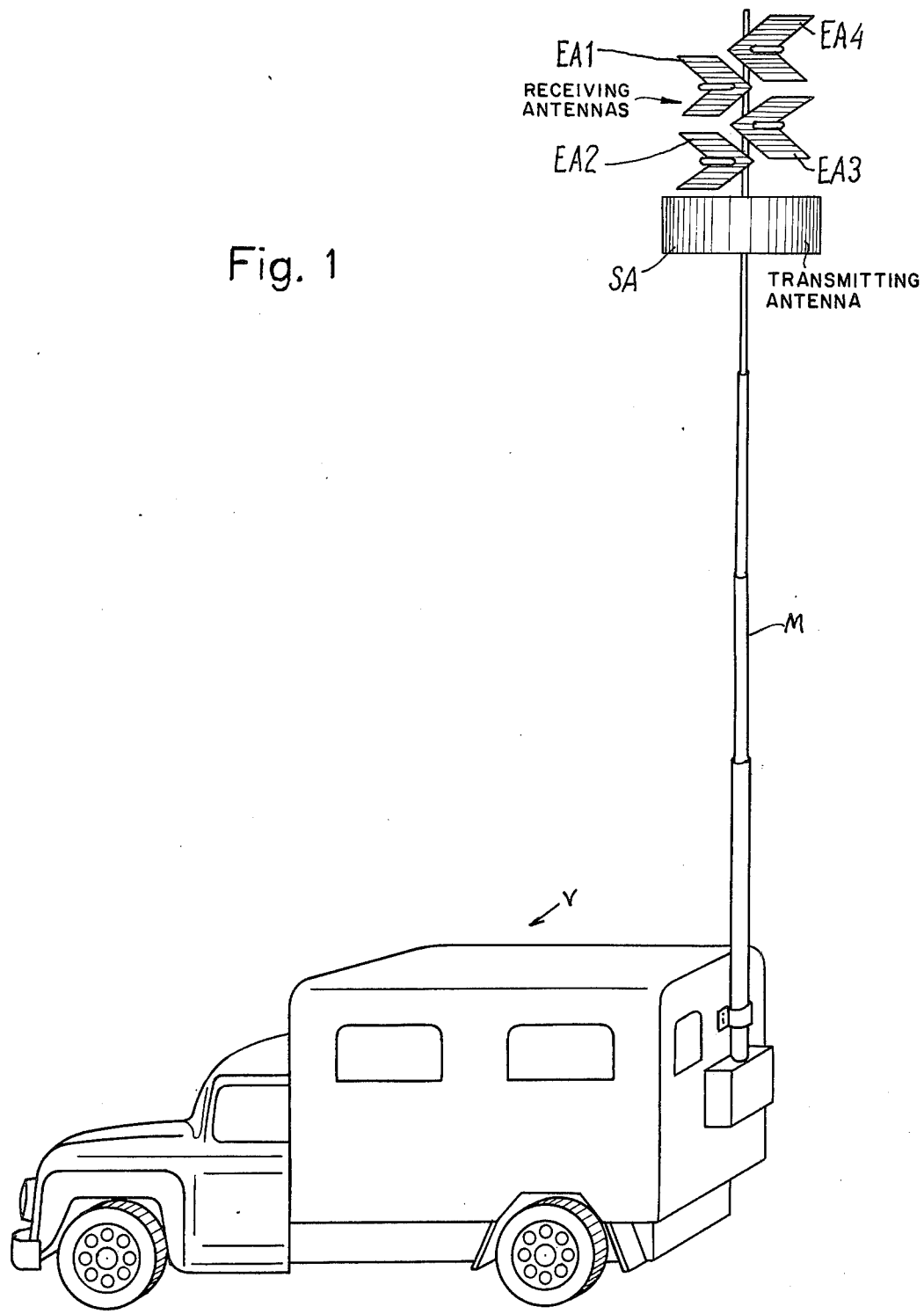
FIG. 1 is a pictorial representation of an exchange housed in a vehicle which has an antenna mast carrying an omnidirectional antenna and a plurality of directional antennas.

Prior to the detailed description a general explanation of abbreviations and art terms is provided for a better understanding of the invention. These are as follows:

RV—directional radio connection.

Group Strength—the number of speech channels which are combined in a common transmission path.

Control Channel—a transmission channel for constructing, maintaining and releasing a connection, usually shared by several speech channels.

Radio Subscriber—a subscriber who is connected to an exchange by way of a radio connection and can be selectively addressed by the latter or can address other subscribers via the latter.

Wire Subscriber—a subscriber who is connected with an exchange in accordance with conventional telephone and exchange connection techniques.

Radio Concentrator (FUKO)—apparatus for combining several radio subscriber connections with a common selective call system.

Wire Concentrator (DRAKO)—a common apparatus for combining telephone traffic, for example with the help of prior known pre-selection or call search methods. Erl/Subscriber--the time actually available to the individual subscriber for connections during a period of time, such as 24 hours, in the case of a statistic distribution of traffic.

Example: During a statistic traffic distribution, a subscriber has 4.8 hours available for his use with a period of 24 hours, without causing an overload of the network. This will result in 0.2 Erl/Subscriber.

RF—radio frequency, i.e. the frequency emitted on the radio path or received on such path.

The safety factor in a meshed information network can be increased in an effective manner by a far-reaching decentralization, i.e. by means of intensive refinement of the mesh structure. An increase in the number of intersections, i.e. exchanges per unit of area, for example between the factors of 2 through 4 when compared with different known systems, however, is then only useful when the intersections become technically more simple and easier to install and operate.

The most expensive parts of a conventional intersection, with respect to the design and construction of the apparatus, are the directional radio connections (RV) to the adjacent intersections. Given RV systems are usually purely utilized in a narrow mesh network since the requirements of channel capacity and transmission outreach are drastically reduced. Quite contrary to this, the embodiment of the relay network according to the present invention comprises one multiplex-channel transmitter for each exchange which is connected with a transmitting antenna, preferably an omnidirectional horizontal grouping antenna, and is received by all adjacent intersections (exchanges) through the use of directional receiving antennas. The former transmission side transmission selective exchange device is continuously omitted; rather, the individual exchanges will obtain the portions directed thereto respectively from the information current received from the adjacent exchange. The "grouping strength" between the exchanges is therefore completely variable. The traffic capacity of an intersection (node) automatically distributes itself to the connections to the adjacent exchanges, according to the traffic requirements.

The construction of the connection can advantageously be organized by way of a single control channel, proceeding from the individual exchange in the transmission direction. This control channel is continuously received by the adjacent exchanges. It is advantageously also possible to reserve further freely available channels within the network for special services. Such special services, for example, may be an all-around announcement, priority connection requests, etc.

The diverse subscribers must be connected to the individual exchange. The radio subscribers hereby operate with a speech preparation of a low bit rate (Vocoder) via a radio connection in most cases. The radio subscriber or radio relay network, respectively, can therefore also operate with a lower rate of bits, as opposed to that known from the prior art. The radio subscribers can be connected to the individual exchange by way of the radio concentrators (FUKO) and wire subscribers, for example, narrowly defined, firmly wired networks, may be connected by way of wire concentrators (DRAKO). A radio network according to the present invention may, for example, comprise 40 exchanges or intersections upon a surface 50km × 150km, whereby an external traffic capacity of at least 0.2 Erl/Subscriber is obtained with a speech channel group of, for example, 40 individual channels per transmitter of an exchange having, for example, a total of 2000 subscribers. The demands to be made of a modern selection system, such as automatic subscribers search, mnemotechnical numbering, and priority classes, among other things, can be fully taken into account. The individual exchange is independent to a great degree from its adjacent exchanges. Changes of the network structure can be carried out with little operational expense. The radio planning can be more effective, according to the rules of mobile radio transmission. The directional radio rules with their limiting conditions for the selection of the location must normally not be considered any longer, but it is recommended to select the radio frequency range of between 200–1000 MHz, in particular 200–400 MHz for the operation of the network. In the case of difficult landscapes, individual meshes can be constructed with conventional transmission means without causing changes in the exchanges.

As opposed to the heretofore known conventional systems, the devices of the exchange (without concentrators and their suppliers) can be housed in a vehicle V. This is indicated in FIG. 1. The heretofore unavoidable vehicle concentration at the individual exchange can therefore be omitted. The transmission antenna SA is embodied as an omnidirectional antenna. The exchange is to cooperate with four other exchanges and therefore has four directional antennas EA1, EA2, EA3 and EA4 which are utilized as receiving antennas. These latter antennas are embodied as V-reflector antennas in the particular sample embodiment illustrated in FIG. 1. All antennas are attached to a mast M anchored to and carried by the vehicle V.

As was stated above, such a network will become safer with respect to destruction when the meshes become more narrow, i.e. as the number of exchanges increases. If a purely digital network is constructed, almost no limit with respect to the number of exchanges will be provided on the basis of the regenerateability of the digital signals from the transmission side, i.e. with respect to the noise summing. With an optimum meshing of the network, however, the number of required directional radio devices will essentially increase.

Figure 2:
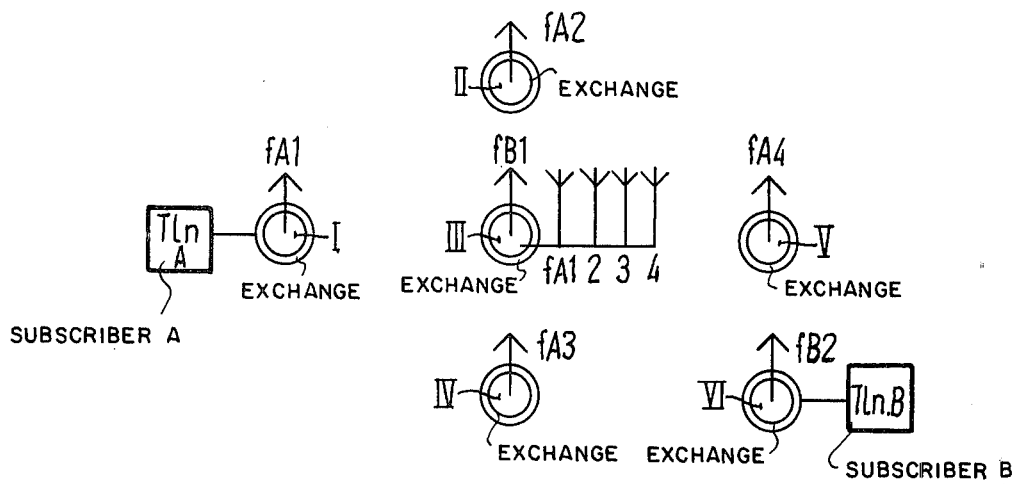
FIG. 2 is a schematic illustration of the distribution of exchanges over a given area.

The network structure which has resulted during the production of a radio network comprising such exchanges can be recognized with the help of an intersection group, as illustrated in FIG. 2. The intersection group of FIG. 2 is therefore the group of exchanges which, with respect to the transmitter of an exchange, can be obtained. The above mentioned concept of the radio selection method is a multiple-access method. Only one transmitter is provided per exchange. Four multiple receivers, for example, are provided, and these are connected with antennas, preferably remote controlled directional antennas, in order to receive the RF signals or channel groups, respectively, from the adjacent exchanges. More specifically, the transmission frequencies of the individual exchanges I, II, IV and V are referenced in FIG. 2 by the characters fA1-fA4, and the transmission frequency of the exchange III is referenced fB1. A further exchange VI, which can not be directly reached from the exchange III, transmits at the frequency fB2. The duplex formation is effected in the frequency plane. Thereby, only the transmission frequencies of the individual exchanges must be planned or provided, respectively, in connection with the transmission frequencies of the adjacent intersections. It must still be mentioned that the state of frequencies are not individual discrete frequencies, but indicate different frequency ranges, corresponding to the explanations given with respect to FIG. 3 in the following.

Figure 3:
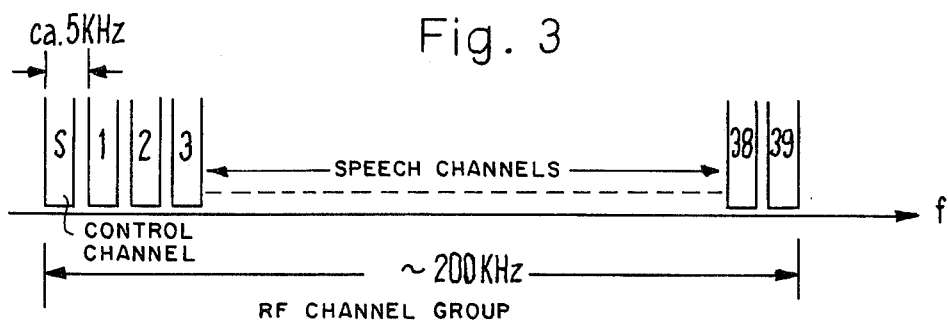
FIG. 3 is an illustration of the frequency distribution for an RF channel group of forty speech channels in accordance with the frequency multiplex technique.

The transmission, as it has been mentioned before, is effected by the application of the frequency multiplex technique, whereby 40 speech channels with an information flow of 2.4 kbit/sec, respectively, are united to become an RF channel group, in the sample embodiment illustrated in FIG. 3. FIG. 3 shows the frequency distribution in such a group. The first channel in the sample embodiment is applied as a service and control channel S. With the remaining channels 1-39, the external traffic is carried out between exchanges. The channel group therefore has a bandwidth of approximately 200 kHz.

In the sample embodiment, the RF channel groups of a maximum of four adjacent exchanges are received in each exchange. Only the channels (maximum of 39) which are instantaneously exchanged in the respective exchanges are taken into account during the distribution into the individual speech channels of a maximum of 160 channels offered. For this purpose, a through-switching network may be provided in the so-called ZF plane of the individual receivers which can be directly followed by the channel demodulators. The association of the individual channel demodulators with the receiver of the desired RF channel group as well as the selection of the data channel in this RF channel group are then merely to be determined by the control system while the connection is established. Merely the four control channels must then constantly be received in the exchange and evaluated in a control system.

Figure 4:
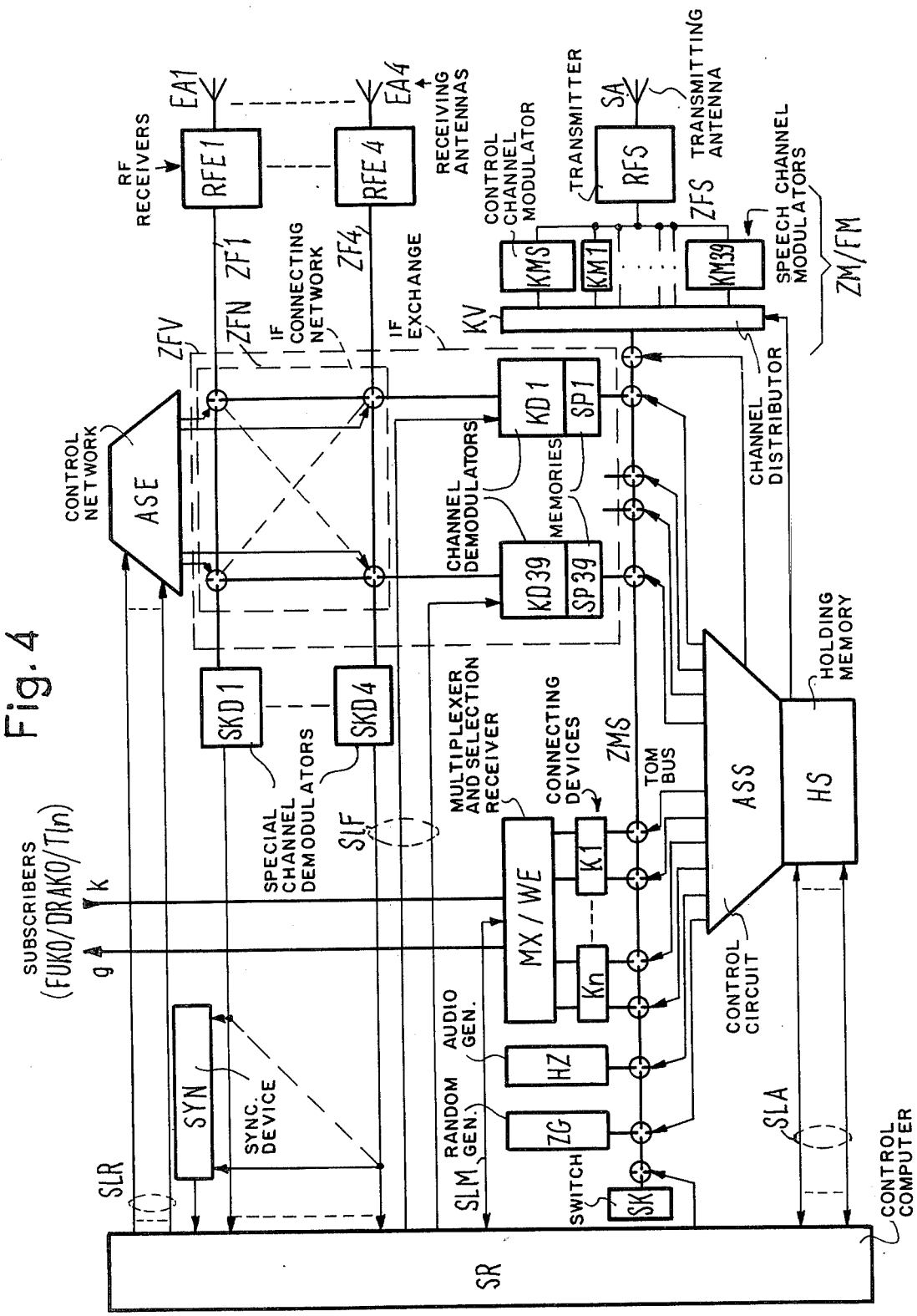
FIG. 4 is a schematic block diagram of an exchange constructed in accordance with the principles of the present invention.

In order to realize the aforementioned mode of operation of the system, according to this invention, and with this sample embodiment, the individual exchange is advantageously embodied in such a way as shown in FIG. 4. The transmission antenna SA and the four receiving antennas EA1-EA4 have been schematically indicated.

In order to obtain a better overall view, only the processing path for the antenna EA1, the antenna EA4 and the antenna SA have been shown in detail. The antenna EA2 and the antenna EA3 must be provided in a corresponding manner. A radio frequency signal is respectively received by way of the antennas EA1, EA2, EA3 and EA4, and its modulation signal corresponds to a base band as is illustrated in FIG. 3. The base band signal therefore includes individual speech channels in the 40 channel frequency multiplex, where the first channel is provided as a control channel while the remaining 39 channels serve for speech or for the transmission of other signals, such as facsimiles, alternating current telegraphy, etc, respectively. A separate radio frequency receiver RFE is respectively fed by the individual receiving antennas EA so that a total of four such radio frequency receivers RFE1-RFE4 must be provided. These radio frequency receivers preferably have the same intermediate frequency in their output sections. Therefore, four intermediate frequency outputs ZF1-ZF4 are available in the embodiment illustrated. In each intermediate frequency output, 40 speech channels are provided staggered with respect to frequency, corresponding to the frequency multiplex operation. Therefore, a total of 160 speech channels is provided with four receivers. An intermediate frequency exchange ZFV serves for further processing of the 160 speech channels provided by the receivers. A special network section is provided within the intermediate frequency exchange ZFV, namely an intermediate frequency connecting network ZFN. The connecting network ZFN may be embodied as a cross bar distributor, well known in the telephony art, and is advantageously constructed in accordance with modern electronic techniques. Since such cross bar distributors have become generally known in the art, a detailed description will not be provided herein. It is only essential that a cross bar distributor makes it possible to connect each desired speech channel of the intermediate frequency signals ZF1-ZF4 with a desired one of the channel demodulators KD1-KD39. In addition, direct through connections to special distributors are provided for the control channels (S channels illustrated in FIG. 3). These demodulators are referenced SKD1-SKD4. The channel demodulators KD1-KD39 additionally contain a respective memory SP1-SP39 in their outputs in order to be able to carry phase equalizations during the time multiplex exchange within the exchange. These memories are advantageously embodied as 1-bit buffer memories when the information is transmitted with either pulse code modulation or pulse delta modulation.

A corresponding control network ASE for the different receivers is provided in common to the intermediate frequency exchange ZFV for controlling the cross bar distributor ZFN. The control network ASE controls the intermediate frequency network ZFN for connections to the speech channel demodulators KD1-KD39. The control channel demodulators SKD1-SKD4 of the four receivers are normally continuously connected since the connection is constructed by way of these demodulators while a control computer SR is evaluating the control signals. A common time multiplex bus ZMS is essential for the transfer within the individual exchange. It serves for sorting and directing the calls from the individual subscribers or concentrators, respectively (FUKO or DRAKO) and the call is directed to the subscribers, as well as the calls supplied by way of the receivers and the calls to be transmitted by way of the transmitter RFS in accordance with a time division multiplex principle. Therefore, the memories SP1–SP39 are connectable to the time multiplex bus ZMS, in particular in the same manner as all other systems connected thereto, via corresponding electronic switches which are well known per se. The information from the individual speech channels present on the time multiplex bus ZMS, and to be transmitted by the exchange toward all other exchanges, is taken from the time multiplex bus by way of a channel distributor which converts the information in a time staggered manner on the time multiplex bus into 40 frequency staggered individual speech channels. In this manner, the respective first speech channel serves as a control signal channel, as illustrated in FIG. 3, and a corresponding channel modulator KMS is provided for the control signal, while channel modulators KM1–KM39 are provided for the other 39 individual speech channels. The output signal of the combined signals of the channel modulators KMS–KM39 is an intermediate frequency signal, after a corresponding frequency transposition, and it is supplied to the station transmitter RFS as a modulation signal, as an intermediate frequency signal ZFS. The transmitter RFS will transmit this signal in the required radio frequency spectrum (and in this connection reference should be taken to FIG. 2).

As has been mentioned above, the individual subscribers which are connected to the exchange are connected either via radio concentrators or via wire concentrators (FUKO or DRAKO), respectively), or may possibly be connected indirectly. An outgoing line in the direction toward this subscriber or concentrator, respectively, is provided for each one of these connections and is referenced g in FIG. 2. A corresponding incoming line is referenced k. If several subscribers are connected by way of a concentrator, it will be required to provide as many connecting devices K1–Kn at the time multiplex bus ZMS as there are duplex connections or channels from the concentrator to the exchange. These lines to or from the concentrator, respectively, are denoted as outgoing and incoming, in the usual manner, and are therefore referenced by the characters g and k. Since, when a concentrator is switched on, the combined speech channels are either combined according to a time multiplex method, or according to a frequency multiplex method, it will be necessary to subdivide and distribute them to the connecting devices K1–Kn by way of a multiplex device MX which may also contain a selection receiver WE. When the individual subscriber line or duplex line is connected without the interposition of a concentrator, the multiplex device MX will, of course, be omitted and only a selection receiver will be provided, along with the corresponding connection device K. In the embodiment illustrated in the drawings, the multiplex device MX has been shown in order to provide a better overall view. Since not only pure exchange processes must be expected in an exchange, but in the case of occupancy or in the case of interference, certain audio signals must be provided, the audio signals will be injected into the respective connection by way of the time multiplex bus ZMS in an exchange embodied according to the present invention. For this reason, an audio signal generator HZ is connected to the time multiplex bus ZMS, and the generator is actuated by the control computer SR in response to information received by the computer, actuation being effected over a connection which has not been illustrated in detail. Should not all channel modulators KM in the transmission branch be occupied by speech channels, for example since little speech traffic is provided at the time in the exchange, it is recommended to connect the channel modulators which are not used with a random generator which is referenced ZG in the sample embodiment and which emit a signal which is at least similar to a noise spectrum. Therefore, an even occupation of the entire radio frequency band by signal voltages will be guaranteed, even if individual ones of these signal voltages are pure noise voltages. This will have a favorable effect not only with respect to level conditions, but it also prevents information about the utilization factor or the traffic density, respectively, to be obtained without difficulty in the entire network by means of tapping.

The individual systems which are connectable to the time multiplex bus ZMS are, as mentioned above, connected to or separated from the bus by switches, preferably purely electronic switches. A control circuit ASS is provided for controlling the switches and is associated with a holding memory HS for the control circuits in a manner well known in the art. The control circuit ASS and the holding memory HS are connected with the control computer SR via memory read and write connections SLA. A corresponding directional adjustment is provided by means of control computer SR with the help of direction adjustment lines SLR for the control unit ASE. Furthermore the control computer SR supplies corresponding control signals for the individual channel demodulators KD1–KD39 via respective control lines SLF. The multiplex devices of the subscriber connection lines or concentrator lines, respectively, are connected to the control computer SR by way of a multiplex control line SLM in such a way that they will provide their information to the control computer and receive therefrom the corresponding adjusting information with respect to their multiplex method. In order to guarantee a time synchronization of the control computer SR and therefore of the time development for the entire exchange with respect to the individual received signals, the basic timing frequency will be derived from the lines with the help of a synchronization derivation device SYN utilizing the well known phase averaging method. It should still be mentioned that the control computer SR also supplies signals for the control channel in the outgoing direction, i.e. for the transmitter on the basis of the individual information received from the individual other systems. This control channel is passed through a switch SK and connected directly to the time multiplex bus ZMS in a corresponding time section, and information contained therein reaches the corresponding channel modulator KMS for this control channel by way of the time multiplex bus ZMS. From there, the information is emitted toward the transmitter RFS in the intermediate frequency position and is transmitted toward the other adjacent exchanges by way of the antenna SA. It should furthermore be mentioned that carrier oscillation generators must be assigned to the individual channel modulators and that such generators are not illustrated in FIG. 4 for reason of simplicity.

As to the operation of the apparatus of the illustrated radio system, embodied according to the invention, the following statements hold true. If, for example, it is assumed that signals of a speech channel are received by way of the antenna EA1 and the receiver RFE1, and that this speech channel is to be connected toward a subscriber connected to this particular exchange, the corresponding information will be further processed toward the control computer SR from the line ZF1 in the intermediate exchange ZFV and through the corresponding control channel demodulator SKD1. The computer SR controls the connection of the corresponding channel demodulator in the intermediate frequency exchange ZFV. This channel demodulator, in this case the channel demodulator KD1, will receive a corresponding control signal for its carrier generators from the computer SR so that the signal from the corresponding speech channel will be provided in a digital form and the output of the demodulator KD1. This digital signal is intermediately stored by way of the memory SP1 and processed to the time multiplex bus ZMS by way of the corresponding electronic electronic switch. Therefore, the information from the demodulator KD1 will be available within the time multiplex bus ZMS. From there it can be processed by way of the multiplex device MX and by way of an outgoing line g toward a concentrator, or, when the subscriber is connected directly to the time multiplex bus ZMS via a corresponding device directly toward the subscriber.

With respect to a connection or a connection path from the individual subscriber to a different exchange then that to which a subscriber is connected, the following holds true. The connection of subscribers can be effected either via a DRAKO or FUKO concentrator or directly via an incoming line k. If a concentrator (DRAKO, FUKO) is interconnected, a corresponding multiplex system MX, as mentioned before, must be provided in addition to the selection receiver WE. For this reason, the system consist of a multiplex device/selection receiver MX/WE in the sample embodiment. In incoming line is to be connected to the time multiplex bus ZMS by way of the switches K1-Kn, depending on which one has become free. During a multiplex operation, therefore, in an interconnection of a concentrator, the corresponding information of the multiplex device MX is provided to the control computer SR. If only one individual subscriber is connected, the corresponding information will go directly to the control computer. The control computer SR causes operation of the corresponding switching system to be actuated and therefore effects connection of the speech channel supplied over the incoming link to the time multiplex bus ZMS. This speech channel will now be periodically available in a certain time section on the bus ZMS, which time section is respectively determined by the control computer SR. This time multiplex distribution is converted into a frequency multiplex distribution by way of a channel distributor KV, and as further indicated in the drawing by the additional reference ZM/FM. The corresponding conversion into the intermediate frequency is effected by way of a respectively free channel modulator, one of the channel modulators KM1--KM39, and connected toward the transmitter by way of the intermediate frequency line ZFS. The channel modulators KMS--KM39 receive their carrier oscillations from carrier generators (not illustrated) which are of different frequencies. These carrier generators may be continuously in operation, since no multiplex formation in the form of a time multiplex framework will be provided beyond the bus ZMS.

As has been explained above with the help of FIG. 4, one bit buffer memories SP1--SP39 are respectively connected to the outputs of the channel demodulators KD1--KD39. These buffer memories essentially serve for a phase equalization which may be required when the individual speech channel groups, with respect to the digital modulation, are possibly slightly staggered in time with respect to each other at the intermediate frequency outputs ZF1--ZF4 of the individual receivers. Due to the interconnection of the memories, which are interrogated at the operational timing frequency of the time multiplex bus ZMS, the digital information current of the individual receivers can therefore be synchronized to the timing frequency of the time multiplex bus ZMS.

Figure 5:
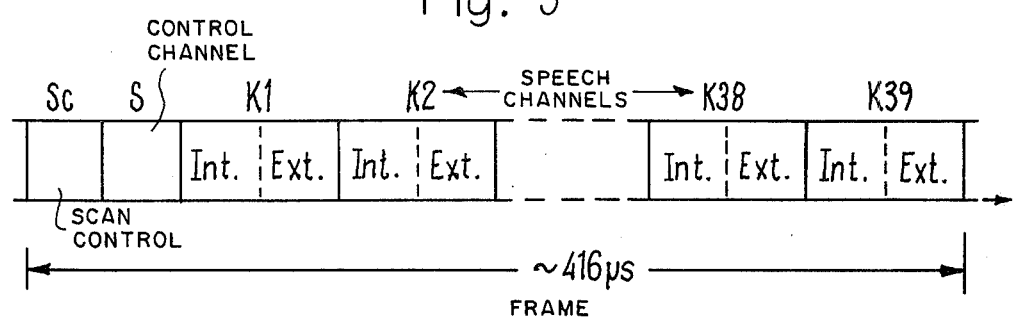
FIG. 5 is a schematic representation of the time development for the actuation of individual switches in the exchange illustrated in FIG. 4.

Simultaneously, another advantageous embodiment of the radio system according to this invention can be obtained due to the switch group controlled by the timing frequency, by way of which the individual circuit groups are connected to the time multiplex bus ZMS. The time multiplex bus ZMS can be considered as an exchange bus according to the time multiplex principle. Therefore, if the switching stages or exchange stages, respectively, are distributed in such a way that with respect to a speech channel a subdivision into an internal exchange interval or switch interval (Int) and an external exchange or switch interval (Ext), respectively is effected, then both the relay traffic between the exchanges are connected by way of the receivers and the transmitters and the external traffic between the exchanges and the subscribers connected therewith can be effected. In FIG. 5, the time multiplex framework resulting in this manner has been illustrated. The framework repeats periodically and may, for example, have a duration of 416 microseconds. The references K1--K39 represent the speech channels which are available. A broken line separation is indicated for each speech channel as it is subdivided into an internal control phase portion and an external control phase portion. S is the control phase portion for the control channel of the transmitter. The previous control phase portion Sc serves for controlling the internal organization development (scanning) in a manner which is known per se for a time multiplex exchanges. FIG. 5 therefore provides an overall view for the time multiplex development of the actuation of the individual switches by way of which the different other circuit groups are connected to the time multiplex bus ZMS. Corresponding to FIG. 5, a connection for the internal traffic following the connection of the control channel S may first of all be provided for the speech channel 1, then the connection of the speech channel 1 for external traffic will be effected, then the connection of the speech channel 2 for the internal traffic will be effected, and then the connection of the speech channel 2 for external traffic will be effected, etc. After approximately 416 microseconds the entire process will repeat. Due to this time staggered connections of the individual circuit groups, it is also possible to provide information input and output in such a manner that the switches are embodied according to the principle of resonant transfer, i.e. the loss-free transmission technique which has been long well known in the art for time multiplex exchange connections.

A connection by way of the network might function in the following manner:

(a) A subscriber A (see FIG. 2) selects the call number of a subscriber B. The intersection or exchange KnI will record the selection and determine whether the subscriber B is or is not connected thereto.

(b) The exchange KnI will emit a search message in the S channel. This message will be received by all adjacent exchanges (KnIII in this example).

(c) The subscriber B is also not connected to the exchange KnIII; the exchange will further process the search message to the adjacent exchanges KnII, KnIV, KnV. The message is added to the search message that has been received by the exchange KnIII with a frequency fA1, which is departing from the exchange KnI.

(d) The exchanges KnII, KnIV and KnV will also further process the search message and will add the directional characteristics for B1, i.e. for the exchange KnIII.

(e) The exchange KnVI will receive the search message upon the frequencies fA3 and fA4. Since both signals are equal, it will, for example, select the signal arriving from the exchange KnIV. It will then determine that the subscriber B is connected thereto and will initiate a reverse connection (RW) by directly addressing the exchange KnIV.

(f) The exchange KnIV will react and extend this connection toward the exchange KnI due to the added directional characteristic.

By means of this modified "all-around call" method without a receipt message, during the search message transmission, a temporary maintaining of the selected connection paths while anticipating a reverse construction will be eliminated. The return path is, rather, constructed entirely anew, respectively, with the help of the previously utilized directional characteristics, whereby it is possible without difficulty that the channels recognized as free in the search process have been occupied in the meantime. Now, each channel of the exchange can be directed to each adjacent exchange, as a characteristic property of the method according to the present invention. It suffices when one or two channels per exchange are reserved for such cases. Priority connections can also be constructed via such channels if no regular channels are free.

In order to avoid the possibility that information flow is interfered with even with the transmission by way of many exchanges, the entire network should be synchronous with respect to the timing frequency of 2.4 kHz. This can be accomplished with the phase averaging method as was explained in connection with FIG. 4. An asynchronous operational method, for example with the aid of a "stuffing" technique could be employed.

The network organization according to the present invention entails essentially advantages with respect to the ECM resistance (resistance ability of the system with respect to enemy radio interferences):

(a) Due to the application of only one transmitter per exchange, a more simple adaptation to ECM is possible due to the increase of transmission power.

(b) The increase of the effective transmission power per channel can be obtained in a simple manner by means of reducing the number of channels.

(c) The automatic subdivision of the exchange capacity results in advantages during a selective influencing of individual RF channel groups.

(d) The small bandwidth of the individual channel increases the safety factor with respect to fast wobble influences. When the aforementioned decrease bit rate is applied (2.4 kbit/sec of the individual speech channel) and stations are employed comprising transmission masts, a high probability of reaching the location is practically always guaranteed with a short distance provided by a narrow mesh network. However, individual meshes of the network may be realized in particular cases by conventional narrow-band RV devices or scattered devices without requiring essential technical changes in the exchange. Since these devices operate with time multiplex grouping, then merely a corresponding multiplex device must be added, which is known per se.

The supply paths for the connected concentrators can also be constructed with narrow band RV devices via field-cable paths, so that no essential limitations of the exchange selection are provided from this aspect.

Although I have described my invention by reference to a specific illustrative embodiment, many changes and modifications may become apparent to those skilled in the art without departing from the spirit and scope of the invention. I therefore intend to include within the patent warranted hereon all such changes and modifications as may reasonably and properly be included within the scope of my contribution to the art.

I claim:

1. A radio system including a large number of transmitting receiving exchanges spatially distributed over an area and each connected to and serving a large number of individual subscribers who may become interconnected via another such exchange, each of said exchanges comprising means providing a plurality of radio frequency voice channels of different frequency within a frequency range that is fixed for the system, means for pulse modulating signals in said voice channels, a vocoder for reducing the bandwidth of the individual signals in a voice channel, means for transmitting said voice channels including an omnidirectional antenna which radiates toward the other exchanges with little grouping in the plane determined by the exchange, a plurality of means for receiving transmissions from other exchanges including a plurality of directional antennas which group both in the horizontal and vertical planes, and means for connecting said receiving means to a subscriber connected to the exchange.

2. A radio system according to claim 1, wherein several adjacent radio frequency speech channels are grouped as a unit in the radio frequency range, means in said receiving means for processing said grouped channels as a unit and means for separating said channels in the intermediate frequency range.

3. A radio system according to claim 1, wherein said means for receiving includes a plurality of separate receivers each connected to a separate directional antenna and each including a radio frequency superheterodyne stage having an intermediate frequency output, means for separating said channels according to the intermediate frequency signals and means for demodulating the signals in the separated channels.

4. A radio system according to claim 1, wherein said means for receiving includes a plurality of separate receivers each connected to a separate directional antenna and each including a radio frequency superheterodyne stage having an intermediate frequency output, means for separating said channels according to the intermediate frequency signals, and means for relaying the signals of a separated channel to another exchange by connecting a separated channel to said transmitting means.

5. A radio system according to claim 4, wherein said means for relaying signals comprises a regenerating circuit for signals in digital form.

6. A radio system including a large number of transmitting receiving exchanges spatially distributed over an area and each connected to and serving a large number of individual subscribers who may become interconnected via another such exchange, each of said exchanges comprising means providing a plurality of radio frequency voice channels of different frequency within a frequency range that is fixed for the system, means for digitally modulating signals in said voice channels, means for reducing the bandwidth of the individual signals in a voice channel, means for transmitting said voice channels including an antenna which radiates toward the other exchanges with little grouping in the plane determined by the exchange, a plurality of means for receiving transmissions from other exchanges including a plurality of directional antennas which group both in the horizontal and vertical planes, and means for connecting said receiving means to a subscriber connected to the exchange.

7. The radio system of claim 6, wherein said means for modulating signals is a PCM modulator.

8. The radio system of claim 6, wherein said means for modulating signals is a delta modulator.

9. The radio system of claim 6, wherein said means for reducing bandwidth includes a vocoder.

10. A radio system including a large number of transmitting receiving exchanges spatially distributed over an area and each connected to and serving a large number of individual subscribers who may become interconnected via another such exchange, each of said exchanges comprising means providing a plurality of radio frequency voice channels of different frequency within a frequency range that is fixed for the system, means for pulse modulating signals in said voice channels, a vocoder for reducing the bandwidth of the individual signals in a voice channel, means for transmitting said voice channels including an omnidirectional antenna which radiates toward the other exchanges with little grouping in the plane determined by the exchange, a plurality of means for receiving transmissions from other exchanges including a plurality of directional antennas which group both in the horizontal and vertical planes, and means for connecting said receiving means to a subscriber connected to the exchange, several adjacent radio frequency speech channels being grouped as a unit in the radio frequency range, means in said receiving means for processing said grouped channels as a unit and means for separating said channels in the intermediate frequency range, said means for receiving including a plurality of separate receivers each connected to a separate directional antenna and each including a radio frequency superheterodyne stage having an intermediate frequency output, means for separating said channels according to the intermediate frequency signals and means for demodulating the signals in the separated channels.

11. A radio system including a large number of transmitting receiving exchanges spatially distributed over an area and each connected to and serving a large number of individual subscribers who may become interconnected via another such exchange, each of said exchanges comprising means providing a plurality of radio frequency voice channels of different frequency within a frequency range that is fixed for the system, means for pulse modulating signals in said voice channels, a vocoder for reducing the bandwidth of the individual signals in a voice channel, means for transmitting said voice channels including an omnidirectional antenna which radiates toward the other exchanges with little grouping in the plane determined by the exchange, a plurality of means for receiving transmissions from other exchanges including a plurality of directional antennas which group both in the horizontal and vertical planes, and means for connecting said receiving means to a subscriber connected to the exchange, several adjacent radio frequency speech channels being grouped as a unit in the radio frequency range, means in said receiving means for processing said grouped channels as a unit and means for separating said channels in the intermediate frequency range, said means for receiving including a plurality of separate receivers each connected to a separate directional antenna and each including a radio frequency superterodyne stage having an intermediate output means for separating said channels according to the intermediate frequency signals, and means for relaying the signals of a separated channel to another exchange by connecting a separated channel to said transmitting means, said means for relaying signals comprising regenerating circuit for signals in digital form.

* * * * *